(12) United States Patent
Briggs et al.

(10) Patent No.: US 10,031,892 B2
(45) Date of Patent: Jul. 24, 2018

(54) AUTOMATIC GROUPING OF DOCUMENT OBJECTS FOR REFLOWED LAYOUT

(71) Applicant: Konica Minolta Laboratory U.S.A., Inc., San Mateo, CA (US)

(72) Inventors: William John Briggs, Broomfield, CO (US); Stuart Guarnieri, Laramie, WY (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 182 days.

(21) Appl. No.: 14/673,514

(22) Filed: Mar. 30, 2015

(65) Prior Publication Data

US 2016/0292132 A1    Oct. 6, 2016

(51) Int. Cl.
*G06F 17/00* (2006.01)
*G06F 17/21* (2006.01)

(52) U.S. Cl.
CPC .......... *G06F 17/212* (2013.01); *G06F 17/211* (2013.01)

(58) Field of Classification Search
CPC .... G06F 3/0483; G06F 17/211; G06F 17/212; G06F 17/214; G06F 3/0484; G06F 3/0482; G06F 3/0488; G06F 3/0481
USPC ........................................................ 715/246
See application file for complete search history.

(56) References Cited

U.S. PATENT DOCUMENTS

| | | | | |
|---|---|---|---|---|
| 2002/0075290 | A1* | 6/2002 | Rajarajan | G06F 17/509 |
| | | | | 715/700 |
| 2003/0227484 | A1* | 12/2003 | Hao | G06F 3/0481 |
| | | | | 715/765 |
| 2005/0168451 | A1* | 8/2005 | Dodge | G06F 17/242 |
| | | | | 345/179 |
| 2006/0200759 | A1* | 9/2006 | Agrawala | G06F 17/211 |
| | | | | 715/209 |
| 2008/0133189 | A1* | 6/2008 | Criswell | G06T 13/20 |
| | | | | 703/6 |
| 2009/0201270 | A1* | 8/2009 | Pikkujamsa | G06F 1/1626 |
| | | | | 345/184 |
| 2009/0307623 | A1* | 12/2009 | Agarawala | G06F 3/04815 |
| | | | | 715/765 |
| 2011/0193788 | A1* | 8/2011 | King | G06F 3/017 |
| | | | | 345/173 |
| 2012/0290973 | A1* | 11/2012 | Robertson | G06F 3/0481 |
| | | | | 715/801 |
| 2013/0046789 | A1* | 2/2013 | Lulew cz | G06F 17/30292 |
| | | | | 707/792 |

(Continued)

*Primary Examiner* — Scott Baderman
*Assistant Examiner* — Jason Edwards
(74) *Attorney, Agent, or Firm* — Osha Liang LLP

(57) ABSTRACT

A method for arranging graphical objects in an electronic document displayed on a screen of a computing device includes calculating a plurality of positions of the graphical objects displayed on a display area of the screen, grouping the graphical objects whose calculated positions are located within a predetermined area of the display area, calculating a reference point of the group based on each position of the grouped graphical objects, reflowing the grouped graphical objects in response to a variation in display of the electronic document, calculating potential energies for the reflowed graphical objects, and displaying the electronic document with the reflowed graphical objects in a layout having the minimum potential energy among the calculated potential energies.

20 Claims, 12 Drawing Sheets

Electronic document 150

(56) References Cited

U.S. PATENT DOCUMENTS

| | | | |
|---|---|---|---|
| 2013/0086516 A1* | 4/2013 | Rodgers | G06T 13/80 715/799 |
| 2013/0155106 A1* | 6/2013 | Rolleston | G06T 19/006 345/633 |
| 2014/0149903 A1* | 5/2014 | Ahn | G06F 3/0488 715/765 |
| 2014/0208191 A1 | 7/2014 | Zaric et al. | |

* cited by examiner

FIG. 7

Electronic document 150

Electronic document 150

Electronic document 150

AUTOMATIC GROUPING OF DOCUMENT OBJECTS FOR REFLOWED LAYOUT

BACKGROUND

A reflowed layout is commonly used for dynamically displaying the entire contents of an electronic document on a screen of a computer device. In the reflowed layout, an arrangement of the content including text streams and graphical objects (i.e., drawings, photographs, clip arts, tables, etc.) can vary depending on a dimension of the screen and display area, scale configuration, user preference, etc. On the other hand, a fixed layout displays content as they are arranged by an author. In the fixed layout, text streams and graphical objects are displayed at fixed positions on the displayed electronic document. Thus, some parts of the electronic document may be truncated or "clipped" depending on the dimension of the display area. The reflowed layout allows for displaying the entire content without such clipping.

The electronic document typically includes "anchors" for positioning the graphical objects. The position of each graphical object is defined relative to the anchors. Like text characters, the anchors are positioned during rendering of the electronic document. Further, the anchors may be specified before, after, or within the text streams.

Depending on a user operation, such as changing window dimensions, font size of texts, or display orientation (e.g., from portrait to landscape, and vice versa), positions of the anchors may vary. Thus, the positions of the graphical objects may entirely depend on variation of the dimension.

Such a variation may disrupt the original arrangement of the electronic document and negatively affect its visibility and fidelity. To prevent such disruption, a preliminary program or script is generally used to arrange the graphical objects in the reflow layout.

SUMMARY

In general, the invention relates to a method for arranging objects in an electronic document.

In one aspect according to one or more embodiments, a method for arranging graphical objects in an electronic document displayed on a screen of a computing device comprises: calculating a plurality of positions of the graphical objects displayed on a display area of the screen; grouping the graphical objects whose calculated positions are located within a predetermined area of the display area; calculating a reference point of the group based on each position of the grouped graphical objects; reflowing the grouped graphical objects in response to a variation in display of the electronic document; calculating potential energies for the reflowed graphical objects; and displaying the electronic document with the reflowed graphical objects in a layout having the minimum potential energy among the calculated potential energies.

In another aspect according to one or more embodiments, a system for displaying objects in an electronic document on a screen comprises: a memory that stores the electronic document; a grouping unit that calculates a plurality of positions of the graphical objects displayed on a display area of the screen, and groups the graphical objects whose calculated positions are located within a predetermined area of the display area; a calculator that calculates a reference point of the group based on each position of the grouped graphical objects; a controller that: reflows the grouped graphical objects in response to a variation in display of the electronic document; and instructs the calculator to calculate potential energies for the reflowed graphical objects; and a display that displays the electronic document with the reflowed graphical objects in a layout having the minimum potential energy among the calculated potential energies.

In another aspect according to one or more embodiments, a system for displaying objects in an electronic document on a screen, the system comprising: a memory that stores the electronic document; and a processor coupled to the memory, wherein the processor: calculates a plurality of positions of the graphical objects displayed on a display area of the screen; grouping the graphical objects whose calculated positions are located within a predetermined area of the display area; calculates a reference point of the group based on each position of the grouped graphical objects; reflows the grouped graphical objects in response to a variation in display of the electronic document; calculates potential energies for the reflowed graphical objects; and displays the electronic document with the reflowed graphical objects in a layout having the minimum potential energy among the calculated potential energies.

In another aspect according to one or more embodiments, a non-transitory computer readable medium (CRM) storing instructions for arranging graphical objects in an electronic document displayed on a screen of a computing device, the instructions comprising functionality for: calculating a plurality of positions of the graphical objects displayed on a display area of the screen; grouping the graphical objects whose calculated positions are located within a predetermined area of the display area; calculating a reference point of the group based on each position of the grouped graphical objects; reflowing the grouped graphical objects in response to a variation in display of the electronic document; calculating potential energies for the reflowed graphical objects; and displaying the electronic document with the reflowed graphical objects in a layout having the minimum potential energy among the calculated potential energies.

Other aspects of the invention will be apparent from the following description and the appended claims.

BRIEF DESCRIPTION OF DRAWINGS

FIGS. 4-10 each show an example of an electronic document in accordance with one or more embodiments of the invention.

DETAILED DESCRIPTION

Figure 1:
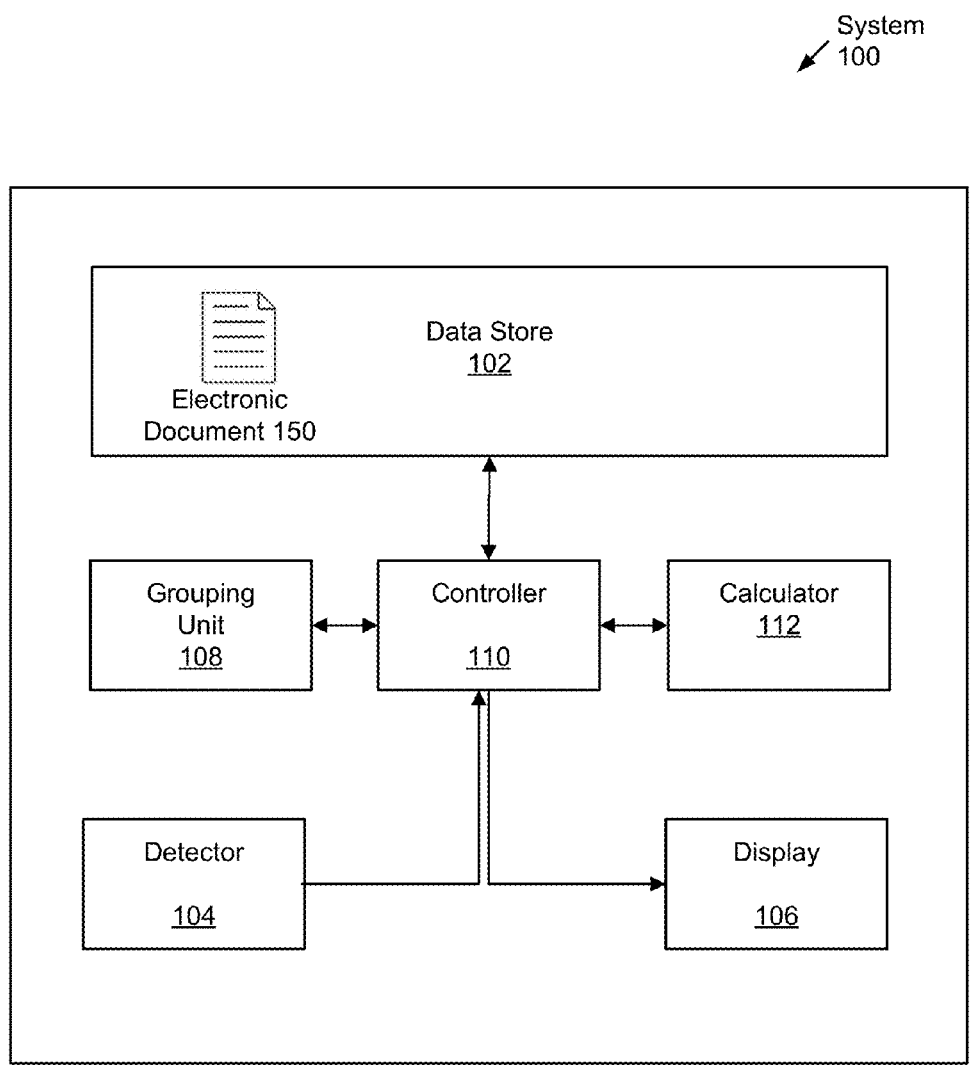
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a system, and a non-transitory computer readable medium (CRM) for arranging graphical objects in an electronic document. For example, the system may load an electrical document that is stored on a local memory of the system or a remote storage device on a network, such as the Internet. Content of the electronic document may be displayed on a screen of the system, and reflowed in response to a variation in display of the electronic document, i.e., a variation in the way or manner the electronic document is displayed. After loading the content including text streams and graphical objects, the system may group the graphical objects. The scope of the present invention is not limited to any particular number or size of the group. For example, the group may include all of the graphical objects in the electronic document or only some of the graphical objects in the electronic document.

In one or more embodiments, graphical objects are drawings, which may be anchored before, after, or within the text streams. The system may calculate positions of some or all graphical objects displayed on a display area of the screen, and group the graphical objects whose calculated positions are located within a predetermined area of the display area. For example, the system may calculate all distances between any two of the graphical objects, and group graphical objects that are arranged within a predetermined distance from each other in the electronic document. Alternatively, the system may choose graphical objects that are arranged within a predetermined-pixel radius. Further, the system may group graphical objects that have no breaks between them. The system may also create a plurality of groups for a single electronic document.

In one or more embodiments, the system may calculate a reference point of the created group. For example, the reference point is a center (center-of-mass) of a bounding box that contains the graphical objects of the group. Alternatively, the reference point may be a center of centroids for the graphical objects. For example, the reference point may be anchored to any position in a text stream that is located near the reference point.

In one or more embodiments, in response to a variation in display of the electronic document, which may be caused by a user operation that changes the dimensions of a window or display area, font size of texts, or orientation of the display, which changes the boundary dimensions of the display area with respect to the font size or the font size with respect to the boundary dimensions, the system may first reflow the text streams based on the dimension of the display area, and determine how to arrange the graphical objects. Any other user operation or system operation related to changing the layout or format of the electronic document may cause such a variation in display of the electronic document. In one or more embodiments, the system may calculate potential energy for one or more arrangements of the grouped objects based on a physics model calculation, and choose an arrangement in which the potential energy is minimum. One example of the physics model is a spring model. The system may calculate the potential energy stored on a virtual spring placed between the reference point and each position of the grouped graphical objects. Herein, a system having virtual springs defined between the reference point and the grouped graphical objects is referred as "a spring system." A formula for calculating such potential energy is known, and the system can calculate the entire potential energy of the spring system by calling a pre-defined function with a parameter, such as variation of the spring length. Alternatively, the system may find the optimum arrangement having a local minimal energy by using known optimal-search algorithms.

According to one or more embodiments, by automatically minimizing visual differences between the original and reflowed layout, no a-priori human intelligence is required. Thus, a document that is not intended for reflowed layout may be converted and manipulated into a more-readable format while preserving the original intention of the document.

FIG. 1 shows a system (100) in accordance with one or more embodiments of the invention. As shown in FIG. 1, the system (100) includes a data store (102), a detector (104), a display (106), a grouping unit (108), a controller (110), and a calculator (112). The system (100) may load an electronic document (150) from the data store (102); group a plurality of graphical objects included in the electronic document (150) via the grouping unit (108); and display the electronic document via the display (106) after arranging the grouped graphical objects based on a physics model calculation in the calculator (112). The detector (104) may detect a user operation, and the controller (110) may control a series of steps executed in the system (100).

Each of these components (102)-(112) may be located on the same computing device (e.g., desktop computer, server computer, laptop computer, tablet computer, smart phone, wearable device, etc.) or may be located on different computing devices connected by a network having wired and/or wireless segments. Further, one or more of these components (102)-(112) may be executed by one or more processors. The data store (102) may store any data that has been processed and/or will be processed by one of the other aforementioned components.

In one or more embodiments of the invention, the detector (104) may detect a user operation that opens an electronic document and causes a variation in display of the electronic document. For example, the detector (104) may detect user operations for opening the electronic document and changing the dimension of the display area (or window) with respect to the font size. The detector (104) may also detect other user operations for changing the font size with respect to the boundary dimensions and the orientation of the system. Additionally or alternatively, the detector (104) may detect a system operation that opens the electronic document and that causes a variation in display of the electronic document. For example, the detector (104) may detect the system operations that change layout or format of the electronic document. For example, the electronic document is defined using a markup language (e.g., Office Open XML (OOXML), OpenDocument Format (ODF), Hypertext Markup Language (HTML), etc.).

In one or more embodiments of the invention, the display (106) may display content of the electronic document based on an arrangement determined by the controller (110). The content includes text streams and graphical objects such as drawings, photographs, clip arts, tables, etc.

In one or more embodiments of the invention, the grouping unit (108) may calculate positions of graphical objects displayed on a display area of the screen, and group graphical objects whose calculated positions are located within a predetermined area of the display area. The grouping unit (108) may group the graphical objects that are within a predetermined distance from each other in the electronic document. The grouping unit (108) may group the graphical objects that have no break between the graphical objects.

The grouping unit (108) may group nearby graphical objects in accordance with various other known algorithms.

In one or more embodiments of the invention, the controller (110) may determine how to arrange text streams and graphical objects of the electronic document. First, in response to a user operation to open an electronic document (150), the controller (110) may load the electronic document (150). Next, the controller (110) may instruct the grouping unit 108 to group the graphical objects included in the electronic document (150).

After grouping the graphical objects, the controller (110) may instruct the calculator (112) to calculate a reference point of the created group. For example, the reference point may be calculated as a center-of-mass of a bounding box that contains the graphical objects. Next, the controller (110) may anchor the center-of-mass before, after, or within a text stream nearby the reference point.

In one or more embodiments of the invention, when the detector (104) detects the above-mentioned user or system operation, the controller (110) may reflow text streams in the electronic document depending on the dimension of the display area. In addition, the controller (110) may reflow the graphical objects in one or more patterns, and instruct the calculator (112) to calculate the potential energy for the reflowing patterns. As used herein, a "reflowing pattern" is a layout arrangement of the grouped graphical objects reflowed by the controller (110). When the controller (110) determines that the potential energy is minimum, the controller (110) may instruct the display (106) to display the content by the determined arrangement.

In one or more embodiments of the invention, the calculator (112) may calculate the reference point of the created group. For example, the calculator (112) may set a center-of-mass of a bounding box that contains the graphical objects of the group as the reference point. Alternatively, the calculator (112) may set a center of each center-of-mass of the grouped graphical objects as the reference point. The calculator (112) may use various known algorithms to calculate the reference point.

In addition, the calculator (112) may calculate a potential energy of the entire spring system, which includes virtual springs defined between the reference point and the grouped graphical objects, in response to the instruction of the controller (110). For example, the calculator (112) may call a pre-defined function (program) for calculating a potential energy based on a variation of the spring length. Before calculating the potential energy, the calculator (112) may calculate the variation of the spring length by the reference point; and the previous position and the current position of a graphical object in advance. In general, a spring force is calculated from F=dK, where "d" is the deflection distance, and "K" is the "stiffness" factor of the spring. Thus, the potential energy may be calculated from $P=Kx^2/2$, where "x" is a displacement of the spring due to stretching or compression.

While FIG. 1 shows one particular configuration of components for illustration purposes, other configuration may be used without departing from the scope of the invention. For example, various components may be combined to form a single component. As another example, the functionality performed by a single component may be performed by two or more components.

Figure 2:
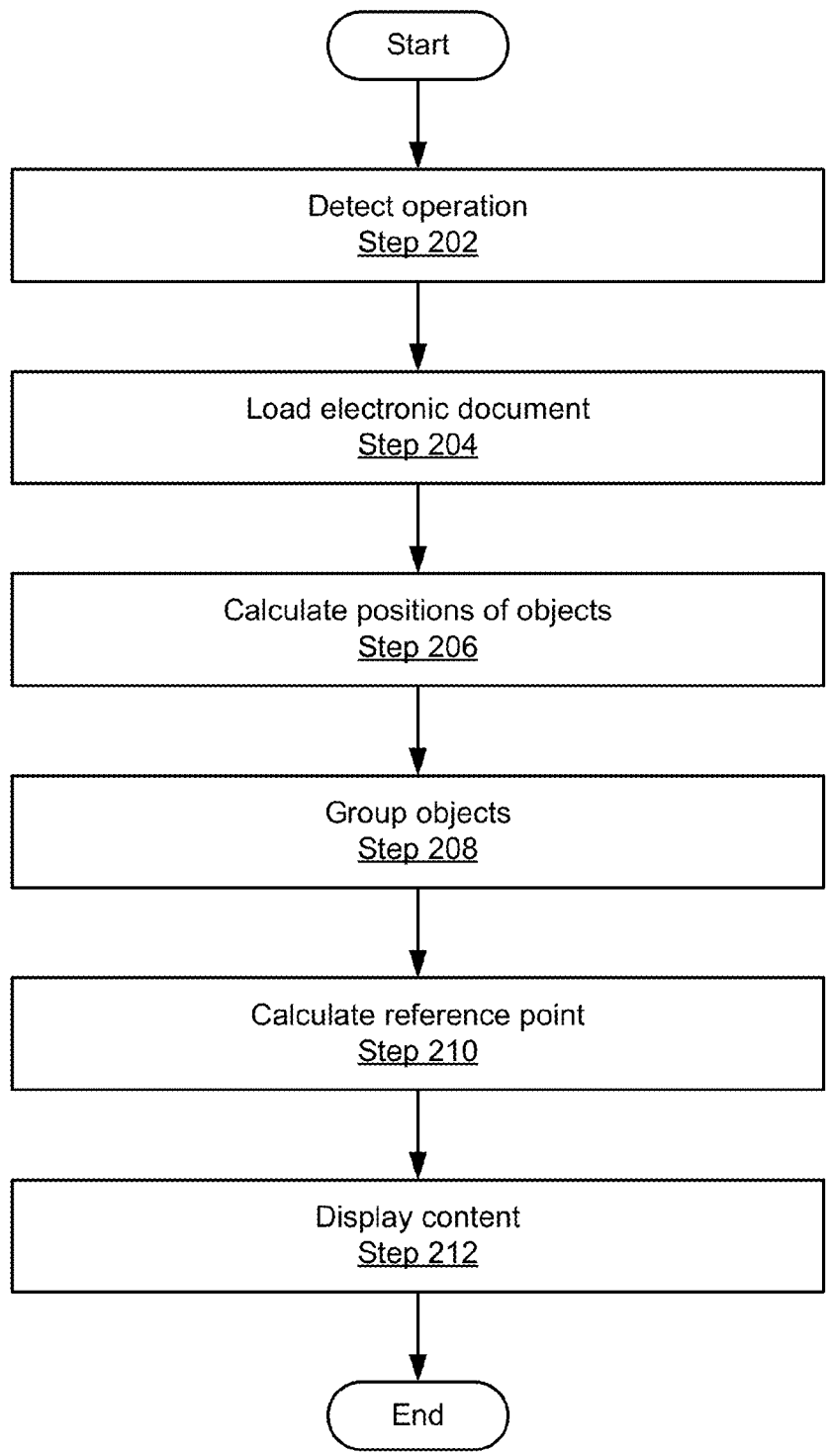
FIGS. 2 and 3 each show a flowchart in accordance with one or more embodiments of the invention.

FIG. 2 shows a flowchart in accordance with one or more embodiments of the invention. The process depicted in FIG. 2 may be used to load an electronic document and group a plurality of graphical objects included in the electronic document. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention is not limited to the specific arrangement of steps shown in FIG. 2.

Initially, the detector (104) may detect a user or system operation for opening an electronic document (150) (Step 202). Next, the controller (110) may load the electronic document (150) from the data store (102) (Step 204).

In Step 206, the controller (110) may instruct the grouping unit (108) to calculate the positions of all graphical objects displayed on a display area of the screen.

Figure 4:
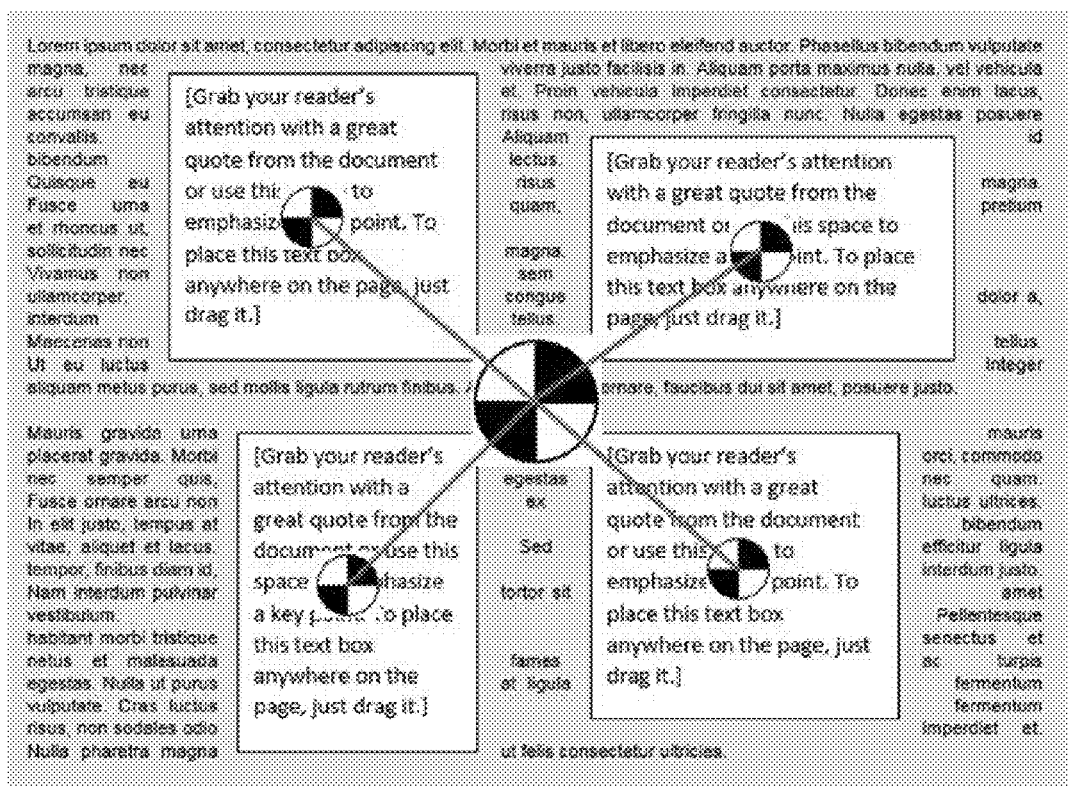

In Step 208, the controller (110) may instruct the grouping unit (108) to group graphical objects whose calculated positions are located within a predetermined area of the display area. The grouping unit (108) may group the graphical objects that are, for example, within a predetermined distance from each other and/or that have no break between the graphical objects. FIG. 4 shows an example of the created group including four graphical objects.

In Step 210, the controller (110) may instruct the calculator (112) to calculate a reference point of the group created in Step 206. The calculator (112) may calculate a center-of-mass of a bounding box that contains the graphical objects of the group as the reference point. As shown in FIG. 4, a big circle indicates the reference point of the group, and four small circles indicate center-of-mass of the graphical objects. The controller (110) may store information about the created group, the positions of the grouped graphical objects, the calculated reference point, and any other data required for later calculations on the data store (102).

In Step 212, the controller (110) may instruct the display (106) to output content of the electronic document (150). In this initial state, the electronic document may be displayed as designed.

In one or more embodiments of the invention, the controller (110) may load the electronic document from a remote storage device via the Internet. In addition, the controller (110) may initiate loading in response to a signal received from another application or system rather than the user operation. Furthermore, the controller (110) may output the electronic document to another application or system rather than the display (106). Thus, the controller (100) may automatically execute the aforementioned process in response to an interaction with another computer system.

In one or more embodiments of the invention, the calculator (112) may use another model other than the spring model to calculate the potential energy. The calculator (112) may apply various other models in which, when some external force has been applied, a force acts between graphical objects so that they return to the initial states (rest states).

In one or more embodiments of the invention, the calculator (112) may also take into account a potential energy stored on a virtual spring placed between a reference point and its anchor point in the electronic document.

Figure 3:
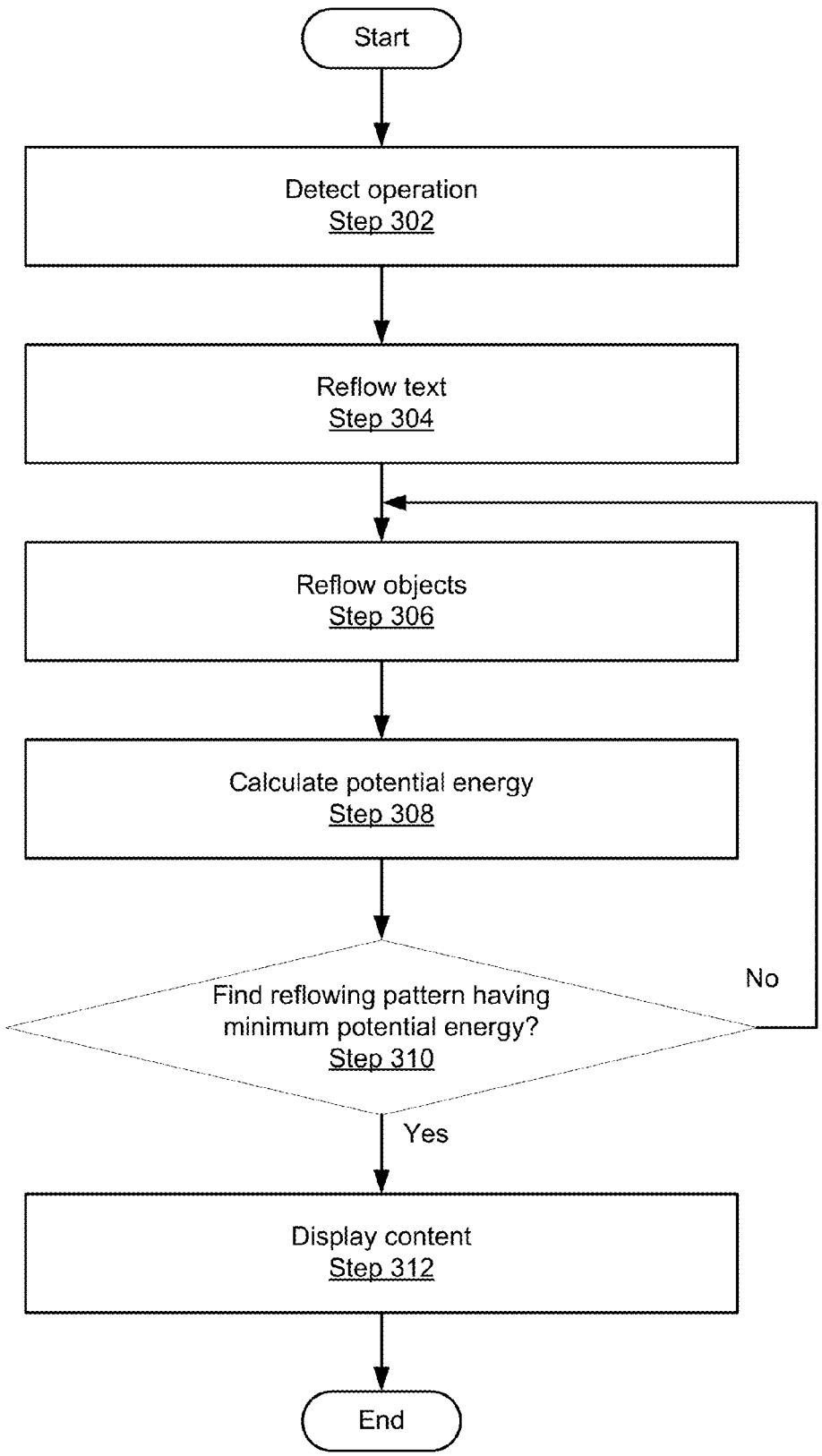

FIG. 3 shows a flowchart in accordance with one or more embodiments of the invention. The process depicted in FIG. 3 may be used to arrange or reflow and display the graphical objects that are grouped in the process discussed above with reference to FIG. 2. One or more of the steps in FIG. 3 may be performed by the components of the system (100), discussed above with reference to FIG. 1. In one or more embodiments of the invention, one or more of the steps shown in FIG. 3 may be omitted, repeated, and/or performed in a different order than the order shown in FIG. 3. Accordingly, the scope of the invention is not limited to the specific arrangement of steps shown in FIG. 3.

In Step 302, the detector (104) may detect a user or system operation that causes a variation in display of the displayed electronic document. The following example assumes that the user performs an operation for changing the boundary of the display area with respect to the font size. In a fixed layout, this would result in one or more of the graphical objects being clipped by a right-hand margin or a left-hand margin.

In Step 304, the controller (110) may reflow text streams included in the electronic documents based on the dimension of the display area. According to a typical reflowing scheme, the controller (110) may simply displace the text streams based on the maximum number of characters or words for the shrunk display area.

In Step 306, the controller (110) may reflow the grouped graphical objects so that the grouped graphical objects can fit into the shrunk display area. When a graphical object overlaps another graphical object in a horizontal direction, the controller may reflow one of the graphical objects in a vertical direction. The controller (110) may iteratively execute Step 306 and subsequent Steps 308 and 310 to find the optimum arrangement for the grouped graphical objects.

Figure 5:
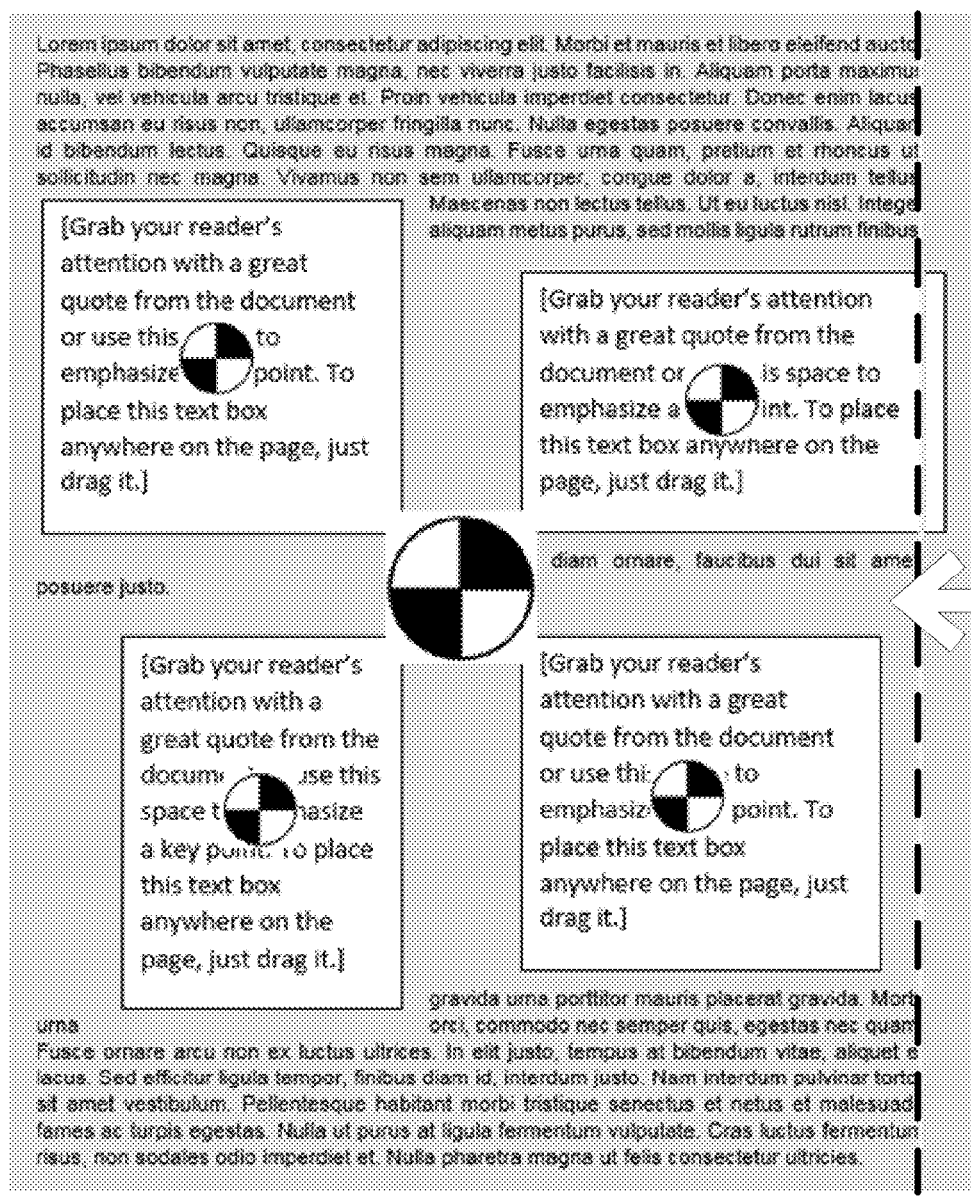
Figure 6:
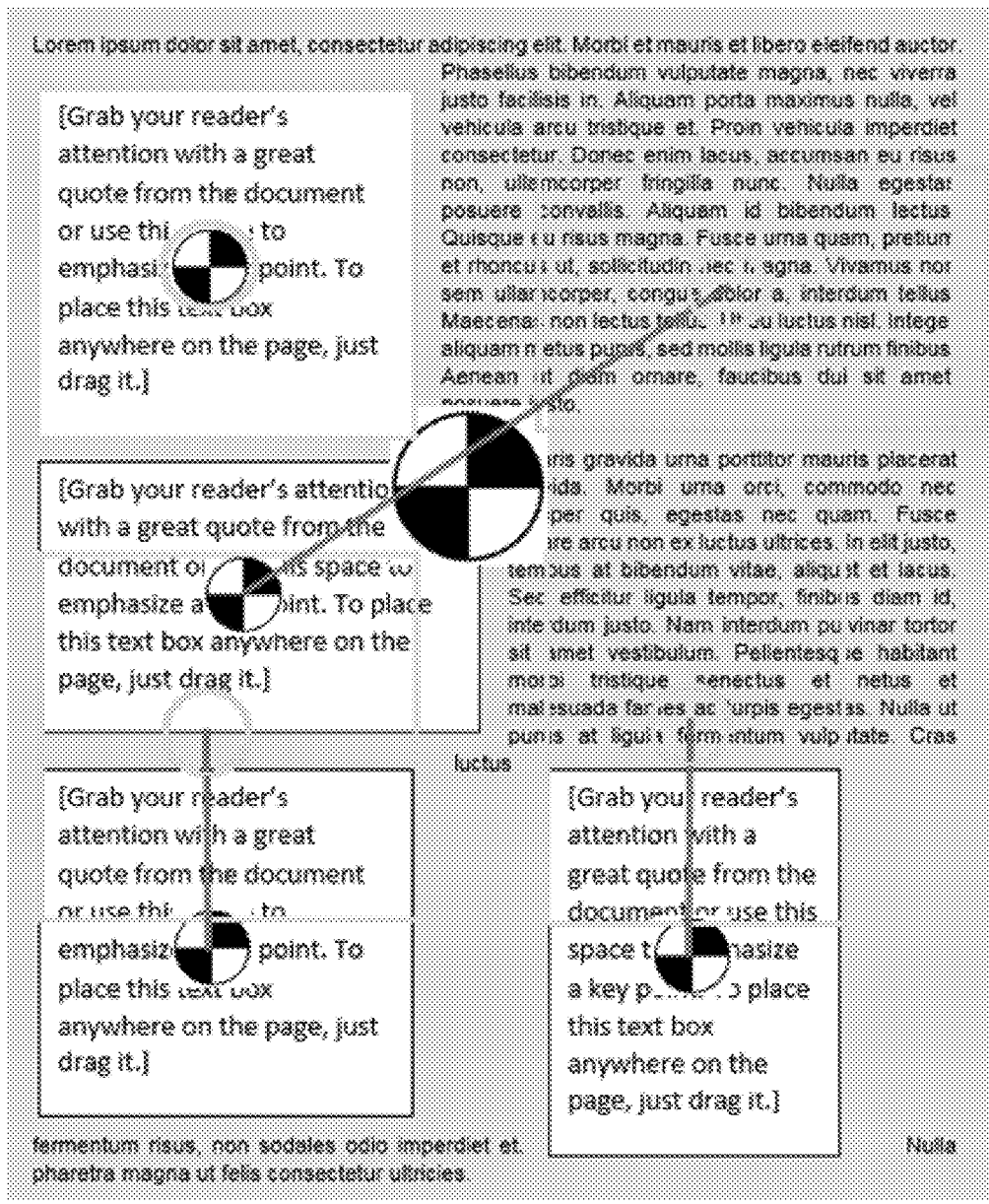
Figure 7:
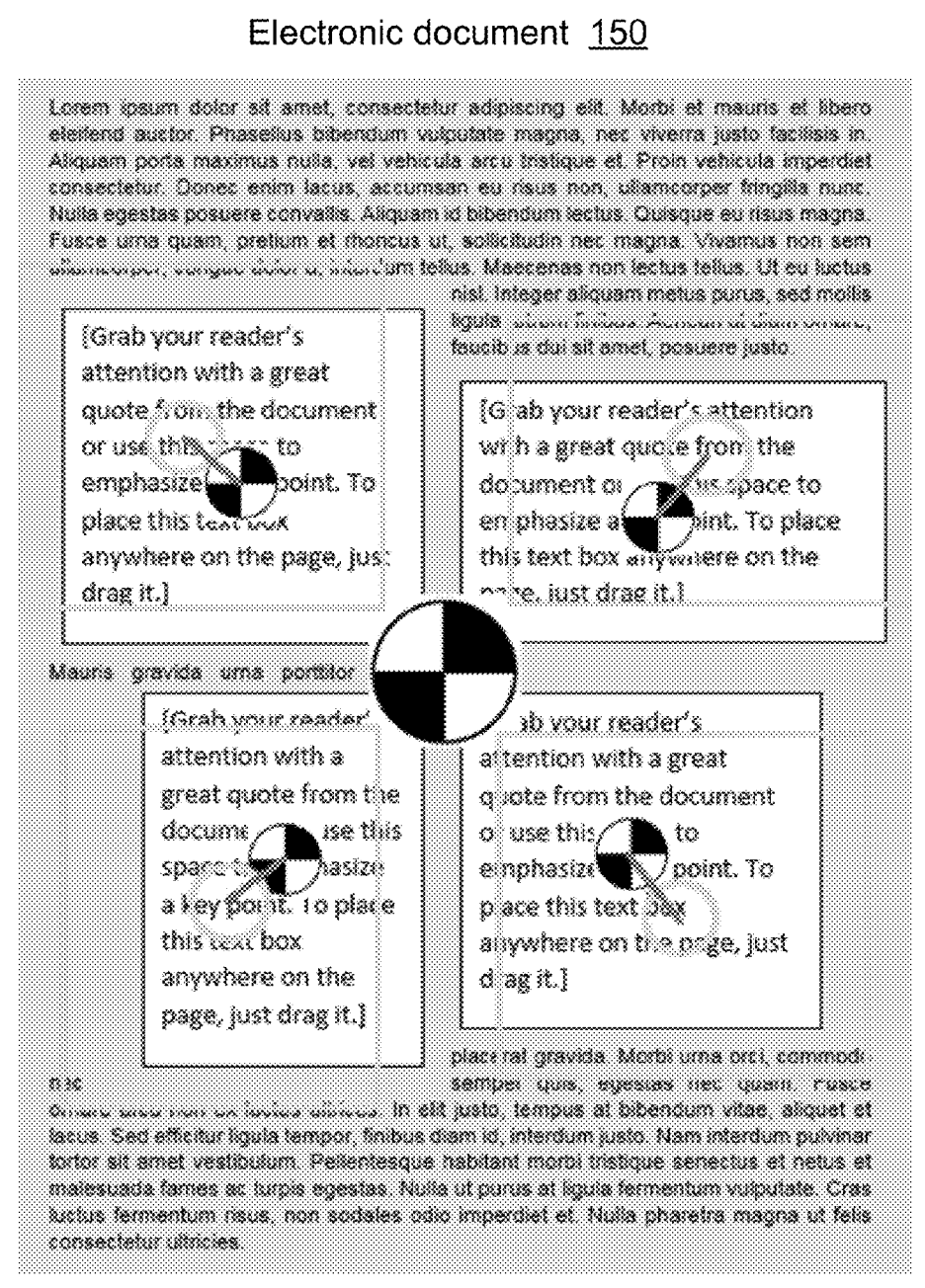

For example, when the width of the display area is shrunk as shown in FIG. 5, and one of the graphical objects should be displaced, the controller (110) may reflow the grouped graphical objects as shown in FIGS. 6 and 7. As shown in FIG. 6, the controller (110) may displace the graphical object under the neighboring graphical object (i.e., wrap the neighboring graphical object). On the other hand, as shown in FIG. 7, the controller (110) may displace all grouped graphical objects so that they gather around the reference point (i.e., squeeze all of the graphical objects).

In Step 308, the controller (110) may instruct the calculator (112) to calculate a potential energy for the reflowing pattern provided in Step 306. The calculator (112) may calculate the potential energy based on variations of the grouped graphical objects. As discussed above, the potential energy may be calculated from $P=Kx^2/2$. The calculator (112) may calculate x (variation) based on the reference point and the previous and current positions of the graphical object. For simplicity and illustration purposes, we assume here that $K/2=1$. In the example shown in FIG. 6, the potential energy $P_1$ may be calculated as follows:

$$P_1 = 0^2 + 6.5^2 + 2.5^2 + 2.5^2 = 54.75$$

On the contrary, in the example shown in FIG. 7, the potential energy $P_2$ may be calculated as follows:

$$P_2 = 1^2 + 1^2 + 1^2 + 1^2 = 4$$

In Step 310, the controller (110) may find a reflowing pattern having the minimum potential energy from among the plurality of calculated potential energies. In the above-mentioned examples, the controller (110) may specify the reflowing pattern shown in FIG. 7 as the reflowing pattern having the minimum potential energy $P_2$. According to one or more embodiments, Steps 306-310 may be iteratively executed until a layout solution with the minimum potential energy is found. In other words, the system according to one or more embodiments of the claimed invention is not limited to considering a finite number of prearranged configuration or reflowing patterns.

In Step 312, the controller (110) may instruct the display (106) to display the content with the reflowing pattern found in Step 310.

In one or more embodiments of the invention, the controller (110) may find a reflowing pattern or layout having the minimum potential energy in response to not only shrinking of a display area but expansion of the display area. The controller (110) may iteratively calculate potential energies for various layouts of the grouped graphical objects until the optimal layout is found. In order to calculate the minimum potential energy, known techniques such as a finite element method (FEM), a downhill simplex method, or a gradient search may be used. In one or more embodiments of the invention, the above-mentioned process may be dynamically performed as a function of a web browser, a document viewer, an electronic book viewer, a print engine, etc. In one or more embodiments of the invention, the above-mentioned process may be contained in the electronic document as a layout engine.

In one or more embodiments of the invention, when one or more of the grouped graphical objects cannot fit into the shrunk display area in a horizontal or vertical direction, the controller (110) may reflow them in a different direction. For example, when the total width of two graphical objects is greater than the width of the display area or window, the controller (110) may reflow the graphical objects in a vertical direction. Thus, one or more embodiments of the invention can find a reflowing pattern having the minimum (or local minimal) potential energy by using a search algorithm. According to one or more embodiments, if the display area is drastically shrunk and the controller (110) is unable to squeeze all of the grouped graphical objects, a quantum jump of energy may be tolerated. The geometry of the collision is analyzed and each item's "rest" centroid is moved by an offset perpendicular to the interpenetration in order to extricate them.

In one or more embodiments of the invention, the history of the reflowing patterns that the controller (110) has found and their potential energy is stored in the data store (102). Calculating the new potential energy to the resulting positions is analogous to a local minima for the system after a quantum (irreconcilable) jump in state. When the display area is expanded in response to the user or system operation, the temporary stability after the quantum jump pattern may unwind itself.

Figure 8:
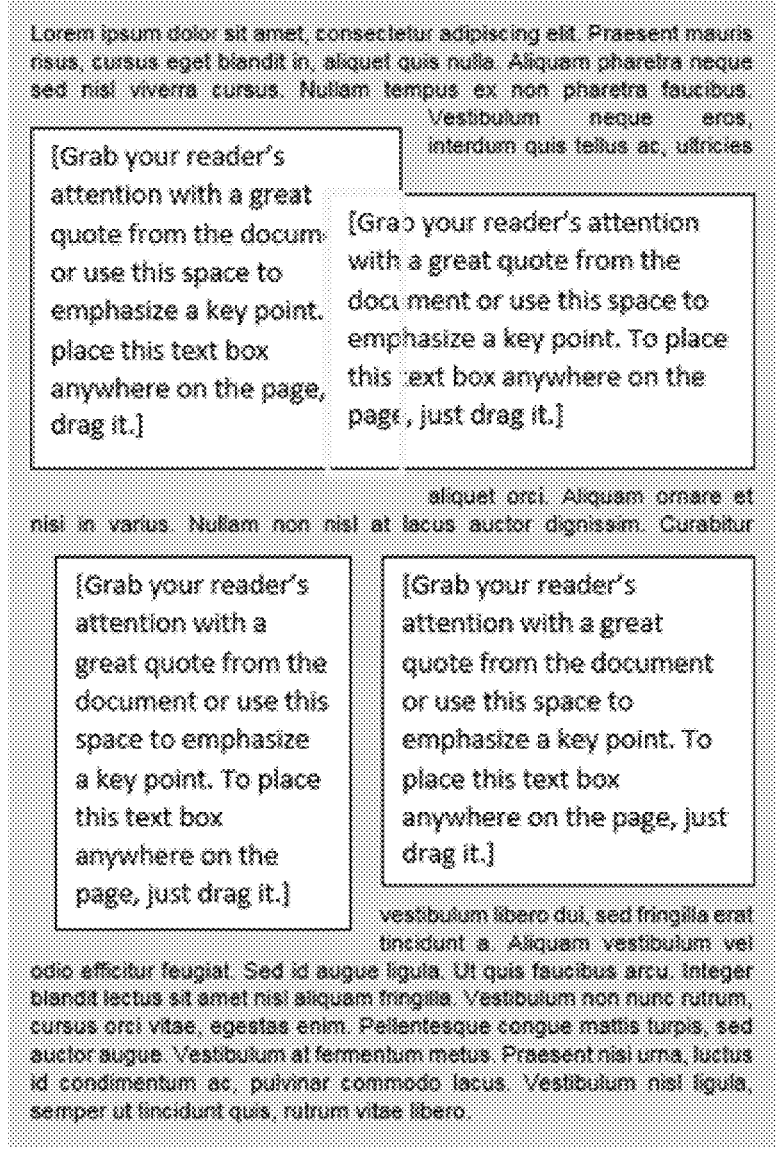
Figure 9:
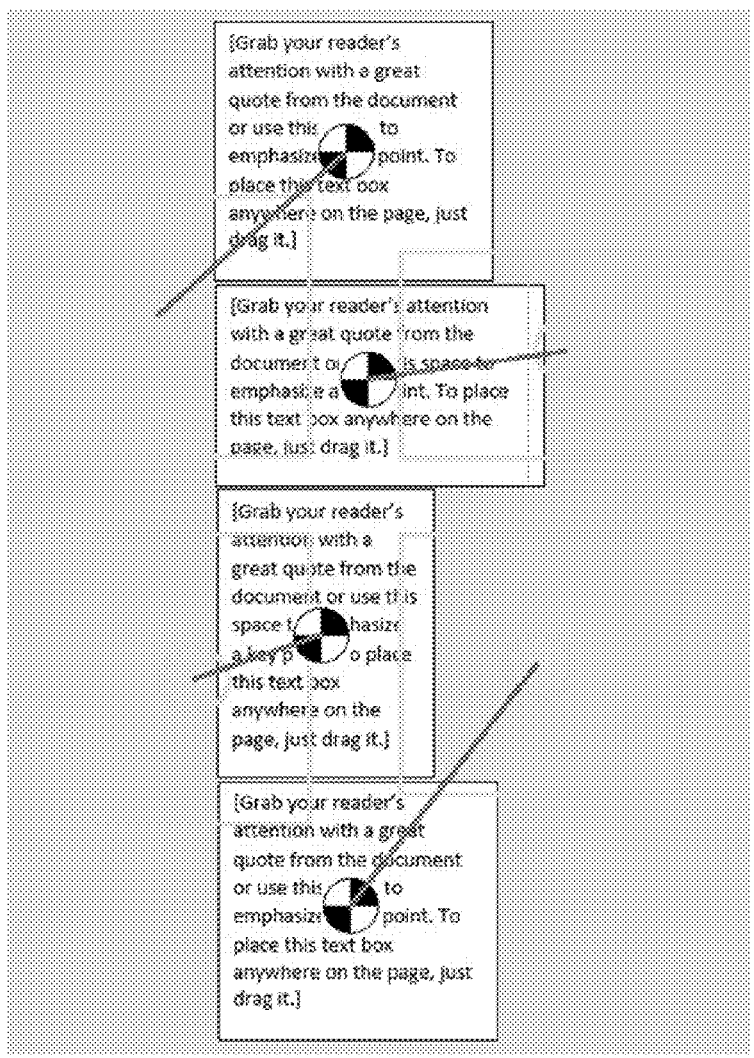
Figure 10:
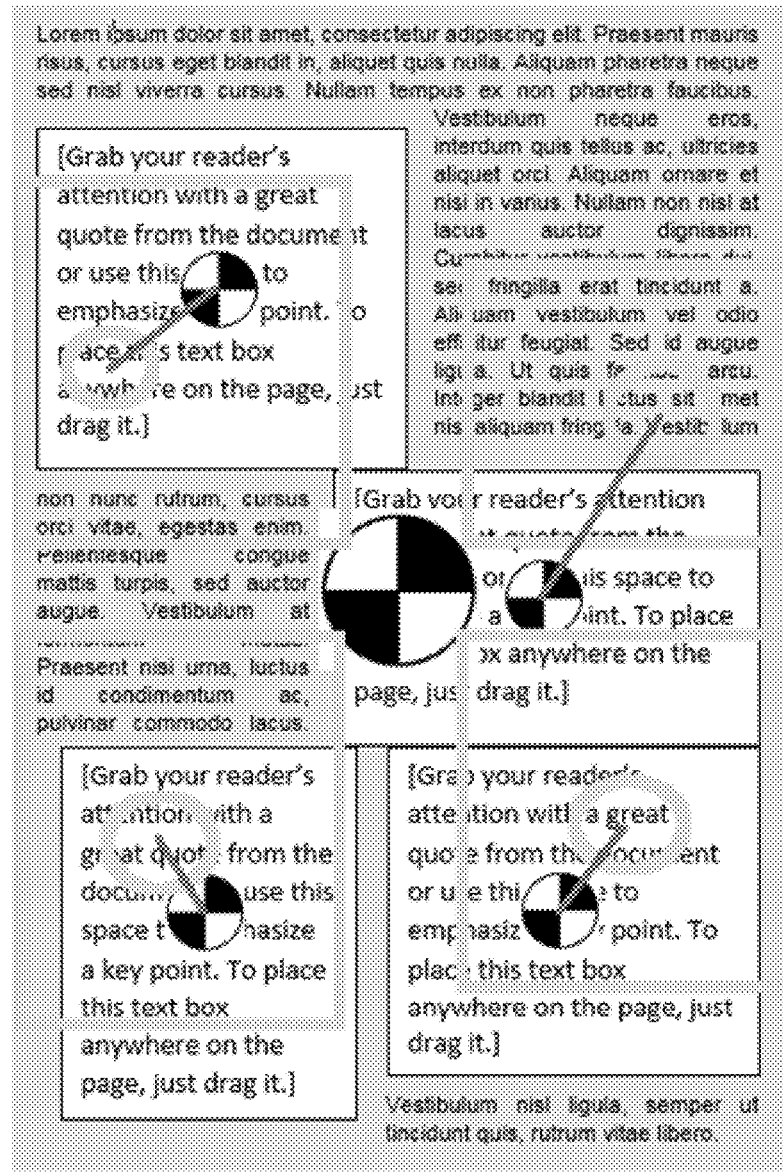

In one or more embodiments of the invention, as shown in FIG. 8, when two graphical objects horizontally overlap due to the user operation for changing the dimension of the display area, the controller (110) may provide the reflowing patterns shown in FIGS. 9 and 10. As shown in FIG. 9, the controller (110) may displace the two graphical objects in tandem. In this example, other two graphical objects are also displaced. On the contrary, as shown in FIG. 10, the controller (110) may displace the right-hand graphical object under the left-hand graphical object (i.e., make the right-hand graphical object slide into the bottom of the left-hand graphical object).

For the reflowing patterns as shown in FIGS. 9 and 10, the calculator (112) may calculate their potential energy $P_3$ (FIG. 9) and $P_4$ (FIG. 10) as follows:

$$P_3 = 4^2 + 3^2 + 2^2 + 5^2 = 54$$

$$P_4 = 1.5^2 + 2^2 + 1^2 + 1^2 = 8.25$$

As a result of the above-mentioned calculation, the controller (110) may instruct the display (106) to display the content with the reflowing pattern shown in FIG. 10. The above example assumes that a language used for the electronic document has a left-to-right text direction. If the language has a right-to-left text direction, the left-hand graphical object may be displaced under the right-hand graphical object (i.e., make the left-hand graphical object slide into the bottom of the right-hand graphical object).

In one or more embodiments of the invention, when two graphical objects vertically overlap due to the user operation, and when a language used for the electronic document has a left-to-right text direction, the controller (110) may displace an upper graphical object at the left side of a lower graphical object. If the language has a right-to-left text direction, the controller (110) may displace an upper graphical object at the right side of a lower graphical object.

Figure 11:
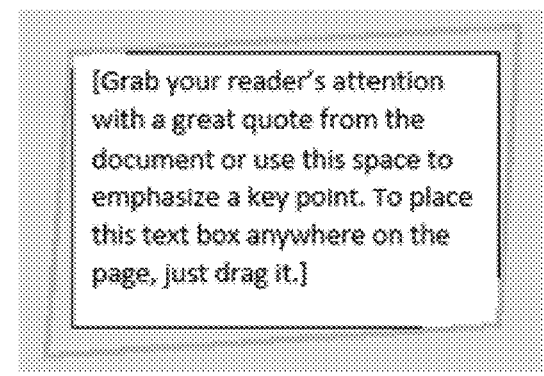
FIG. 11 shows an example of a physics model application in accordance with one or more embodiments of the invention.

In one or more embodiments of the invention, in order to accommodate right-to-left and left-to-right text directions, the controller (110) may apply a physics model to two graphical objects as shown in FIG. 11. When two entities collide due to shrinking of the display area, they are adjusted apart and moved in two dimensions. They are then tested against the constraints (margins) and brought back to colliding again. This iteration yields new positions for both entities which favors the native language text direction (e.g., in the left-to-right direction, entities to the right favor moving down and left favor up, entities above move left and below move right). Again, the controller (110) may iteratively execute the aforementioned Steps 306 through 310 as shown in FIG. 3 until stability is found.

In one or more embodiments of the invention, the controller (110) may initiate reflowing text and graphical objects in response to a signal received from another application or system rather than a user operation. Furthermore, the controller (110) may output the electronic document to another application or system rather than the display (106). Thus, the controller (100) may automatically execute the aforementioned process in response to an interaction with another computer system.

According to one or more embodiments of the invention, simple "potential energy" calculations may be applied to re-layout a document with different page dimensions. As a result, the system may arrange the content depending on the dimension while preserving the look of the original document.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output devices to perform one or more embodiments of the invention.

Figure 12:
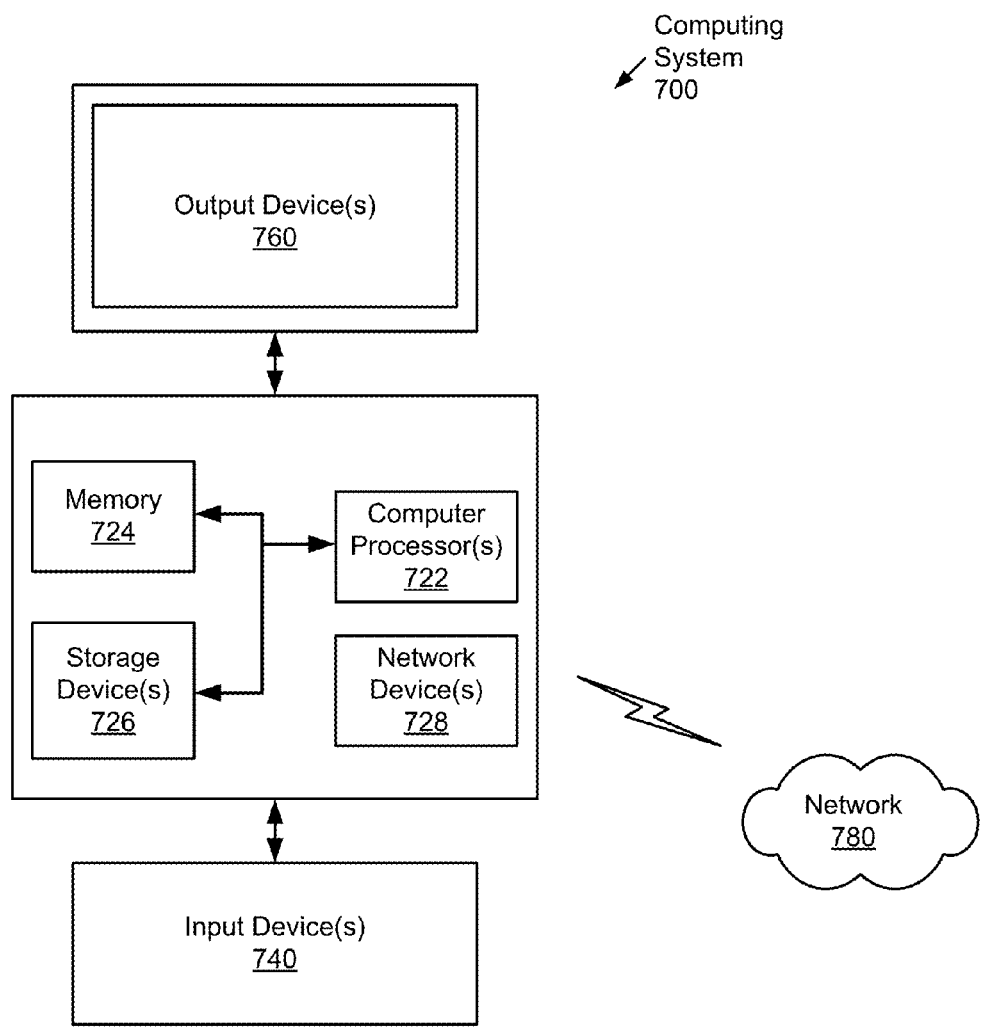
FIG. 12 shows a computer system in accordance with one or more embodiments of the invention.

For example, as shown in FIG. 12, the computing system (700) may include one or more computer processors (722), associated memory (724) (e.g., random access memory (RAM), cache memory, flash memory, etc.), one or more storage devices (726) (e.g., a hard disk, an optical drive such as a compact disk (CD) drive or digital versatile disk (DVD) drive, a flash memory stick, etc.), a network device (728) (e.g., a network interface card, a wireless LAN module, a wide area network module, a Bluetooth module, a ZigBee module, an infra-red communication module, etc.) and numerous other elements and functionalities.

The computer processor (722) may be an integrated circuit for processing instructions. For example, the computer processor may be one or more cores, or micro-cores of a processor. The computing system (700) may also include one or more input devices (740), such as a touchscreen, keyboard, mouse, microphone, touchpad, electronic pen, or any other type of input device. Further, the computing system (700) may include one or more output devices (760), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input devices. The computing system (700) may be connected to a network (780) (e.g., a local area network (LAN), a wide area network (WAN) such as the Internet, mobile network, or any other type of network) via a network interface connection (not shown). The input and output devices may be locally or remotely (e.g., via the network (780)) connected to the computer processor (722), memory (724), and storage device (726). Many different types of computing systems exist, and the aforementioned input and output devices may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor, is configured to perform embodiments of the invention.

Further, one or more elements of the aforementioned computing system (700) may be located at a remote location and connected to the other elements over a network (780). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for arranging graphical objects in an electronic document (ED) displayed on a screen of a computing device following a variation in display of the ED, the method comprising:
    calculating a plurality of initial positions for the graphical objects on a display area of the screen of the computing device, wherein the graphical objects comprise a first graphical object and a second graphical object;
    grouping the graphical objects whose calculated initial positions are located within a predetermined area of the display area;
    calculating a reference point of the group in an area of the ED between the first graphical object and the second graphical object based on a center-of-mass of each initial position of the grouped graphical objects;
    determining, in response to the variation in display of the ED, a first arrangement comprising a first plurality of new positions for the grouped graphical objects, wherein the first graphical object and the second graphical object are separated by a first distance in the first arrangement;

calculating, for the first arrangement, a first sum of a first plurality of potential energies stored in a first plurality of virtual springs stretched between the plurality of initial positions and the first plurality of new positions;

determining, in response to the variation in the display of the ED, a second arrangement comprising a second plurality of new positions for the grouped graphical objects, wherein the first graphical object and the second graphical object are separated by a second distance in the second arrangement that is different than the first distance;

calculating, for the second arrangement, a second sum of a second plurality of potential energies stored in a second plurality of virtual springs stretched between the plurality of initial positions and the second plurality of new positions;

comparing the first sum of the first plurality of potential energies with the second sum of the second plurality of potential energies; and displaying, in response to the second sum being less than the first sum, the ED with the grouped graphical objects in the second arrangement comprising the second plurality of new positions on the screen of the computing device, wherein the graphical objects are not displayed in the first arrangement comprising the first plurality of new positions prior to comparing the first sum with the second sum, wherein the variation in display of the ED is a change in a length and width of the display, and wherein the first sum and the second sum are further calculated based on the reference point.

2. The method of claim 1, wherein
the grouping further comprises grouping the graphical objects that are within a predetermined distance from each other.

3. The method of claim 2, wherein
the grouping of the graphical objects that are located within the predetermined distance further comprises grouping the graphical objects that have no breaks therebetween.

4. The method of claim 1, wherein
the reference point is a center of a bounding box that contains all of the grouped graphical objects.

5. The method of claim 1, further comprising:
when a dimension of the ED is shrunk with respect to a font size of a text stream in the ED and at least one of the grouped graphical objects is clipped by a right-hand margin or a left-hand margin, squeezing all of the grouped graphical objects closer to each other.

6. The method of claim 5, further comprising:
when two of the grouped graphical objects horizontally overlap, displacing a right-hand graphical object of the two grouped graphical objects downward with respect to a left-hand graphical object of the two grouped graphical objects for a language having a left-to-right text direction, and displacing the left-hand graphical object downward with respect to the left-hand graphical object for a language having a right-to-left text direction.

7. The method of claim 5, further comprising:
when two of the grouped graphical objects vertically overlap, displacing an upper graphical object of the two grouped graphical objects leftward with respect to a lower graphical object of the two grouped graphical objects for a language having a left-to-right text direction, and displacing the upper graphical object rightward with respect to the lower graphical object for a language having a right-to-left text direction.

8. The method of claim 1, further comprising:
returning the graphical objects to the plurality of initial positions after displaying the grouped graphical objects in the second arrangement.

9. A system for displaying objects in an electronic document (ED) on a screen following a variation in display of the ED, the system comprising:
a memory that stores the ED, wherein the graphical objects comprise a first graphical object and a second graphical object;
a grouping unit that calculates a plurality of initial positions of the graphical objects on a display area of the screen, and groups the graphical objects whose calculated initial positions are located within a predetermined area of the display area;
a calculator that calculates a reference point of the group in an area of the ED between the first graphical object and the second graphical object based on a center-of-mass of each initial position of the grouped graphical objects;
a controller that:
determines a first arrangement for the grouped graphical objects in response to the variation in display of the ED, wherein the grouped graphical objects are located at a first plurality of new positions in the first arrangement,
wherein the first graphical object and the second graphical object are separated by a first distance in the first arrangement;
instructs the calculator to calculate a first sum of a first plurality of potential energies stored in a first plurality of virtual springs stretched between the plurality of initial positions and the first plurality of new positions for the grouped graphical objects;
determines a second arrangement for the grouped graphical objects in response to the variation in display of the ED, where the grouped graphical objects are located at a second plurality of new positions in the second arrangement,
wherein the first graphical object and the second graphical object are separated by a second distance in the second arrangement that is difference than the first distance;
instructs the calculator to calculate a second sum of a second plurality of potential energies stored in a second plurality of virtual springs stretched between the plurality of initial positions and the second plurality of new positions for the grouped graphical objects;
compares the first sum of the first plurality of potential energies with the second sum of the second plurality of potential energies; and
a display that displays, in response to the second sum being less than the first sum, the ED with the grouped graphical objects in the second plurality of new positions on the screen,
wherein the graphical objects are not displayed in the first arrangement comprising the first plurality of new positions prior to comparing the first sum with the second sum,
wherein the variation in display of the ED is a change in a length and width of the display, wherein the first sum and the second sum are further calculated based on the reference point.

10. The system of claim 9, wherein the grouping unit groups the graphical objects that are within a predetermined distance from each other.

11. The system of claim 10, wherein the grouping unit groups the graphical objects that have no breaks therebetween.

12. The system of claim 9, wherein the reference point is a center of a bounding box that contains all of the grouped graphical objects.

13. The system of claim 9, wherein the controller squeezes, when a dimension of the ED is shrunk with respect to a font size of a text stream in the ED and at least one of the grouped graphical objects is clipped by a right-hand margin or a left-hand margin, all of the grouped graphical objects closer to each other.

14. The system of claim 13, wherein the controller displaces, when two of the grouped graphical objects horizontally overlap, a right-hand graphical object of the two grouped graphical objects downward with respect to a left-hand graphical object of the two grouped graphical objects for a language having a left-to-right text direction, and displaces the left-hand graphical object downward with respect to the left-hand graphical object for a language having a right-to-left text direction.

15. The system of claim 13, wherein the controller displaces, when two of the grouped graphical objects vertically overlap, an upper graphical object of the two grouped graphical objects leftward with respect to a lower graphical object of the two grouped graphical objects for a language having a left-to-right text direction, and displaces the upper graphical object rightward with respect to the lower graphical object for a language having a right-to-left text direction.

16. A system for displaying objects in an electronic document (ED) on a screen following a variation in display of the ED, the system comprising:
a memory that stores the ED; and
a processor coupled to the memory, wherein the processor:
calculates a plurality of initial positions of the graphical objects on a display area of the screen, wherein the graphical objects comprise a first graphical object and a second graphical object;
grouping the graphical objects whose calculated initial positions are located within a predetermined area of the display area;
calculates a reference point of the group in an area of the ED between the first graphical object and the second graphical object based on a center-of-mass of each initial position of the grouped graphical objects;
determines, in response to the variation in display of the ED, a first arrangement comprising a first plurality of new positions for the grouped graphical objects, wherein the first graphical object and the second graphical object are separated by a first distance in the first arrangement;
calculates, for the first arrangement, a first sum of a first plurality of potential energies stored in a first plurality of virtual springs stretched between the plurality of initial positions and the first plurality of new positions;
determines, in response to the variation in display of the ED, a second arrangement comprising a second plurality of new positions for the grouped graphical objects, wherein the first graphical object and the second graphical object are separated by a second distance in the second arrangement that is different than the first distance;
calculates a second sum of a second plurality of potential energies stored in a second plurality of virtual springs stretched between the plurality of initial positions and the second plurality of new positions;
compares the first sum of the first plurality of potential energies with the second sum of the second plurality of potential energies; and
displays, in response to the second sum being less than the first sum, the ED with the grouped graphical objects in the second arrangement comprising the second plurality of new positions on the screen, wherein the grouped graphical objects are not displayed in the first arrangement comprising the first plurality of new positions, wherein the variation in display of the ED is a change in a length and width of the display, wherein the first sum and the second sum are further calculated based on the reference point.

17. The system of claim 16, wherein the processor groups the graphical objects that are within a predetermined distance from each other.

18. The system of claim 16, wherein the processor also: returns the graphical objects to the plurality of initial positions after displaying the grouped graphical objects in the second arrangement.

19. A non-transitory computer readable medium (CRM) storing instructions for arranging graphical objects in an electronic document (ED) displayed on a screen of a computing device following a variation in display of the ED, the instructions comprising functionality for:
calculating a plurality of initial positions of the graphical objects displayed on a display area of the screen of the computing device, wherein the graphical objects comprises a first graphical object and a second graphical object;
grouping the graphical objects whose calculated initial positions are located within a predetermined area of the display area;
calculating a reference point of the group in an area of the ED between the first graphical object and the second graphical object based on a center-of-mass of each initial position of the grouped graphical objects;
determining, in response to the variation in display of the ED, a first arrangement comprising a first plurality of new positions for the grouped graphical objects, wherein the first graphical object and the second graphical object are separated by a first distance in the first arrangement;
calculating a first sum of a first plurality of potential energies stored in a first plurality of virtual springs stretched between the plurality of initial positions and the first plurality of new positions;
determining, in response to the variation in display of the ED, a second arrangement comprising a second plurality of new positions for the grouped graphical objects, wherein the first graphical object and the second graphical object are separated by a second distance in the second arrangement that is different than the first distance;

calculating a second sum of a second plurality of potential energies stored in a second plurality of virtual springs stretched between the plurality of initial positions and the second plurality of new positions for the reflowed graphical objects;

comparing the first sum of the first plurality of potential energies with the second sum of the second plurality of potential energies; and displaying, in response to the second sum being less than the first sum, the ED with the grouped graphical objects in the second arrangement comprising the second plurality of new positions on the screen of the computing device, wherein the grouped graphical objects are not displayed in the first arrangement comprising the first plurality of new positions, wherein the variation in display of the ED is a change in a length and width of the display, wherein the first sum and the second sum are further calculated based on the reference point.

20. The non-transitory CRM of claim 19, the instructions further comprising functionality for:

returning the graphical objects to the plurality of initial positions after displaying the grouped graphical objects in the second arrangement.

* * * * *